United States Patent [19]
Nishihara

[11] Patent Number: 5,483,156
[45] Date of Patent: Jan. 9, 1996

[54] MAGNETIC FIELD ALTERNATION DETECTING APPARATUS

[75] Inventor: Toshihiko Nishihara, Yokohama, Japan

[73] Assignee: Fuji Koki Manufacturing Co., Ltd., Tokyo, Japan

[21] Appl. No.: 77,516

[22] Filed: Jun. 17, 1993

[30] Foreign Application Priority Data

Sep. 22, 1992 [JP] Japan .................................. 4-253277

[51] Int. Cl.⁶ .................................................. G01P 3/48
[52] U.S. Cl. .................... 324/173; 324/174; 324/207.15; 324/207.16; 324/207.24; 324/166; 324/190; 327/100; 327/102; 327/108; 327/170
[58] Field of Search ........................ 324/207.15, 207.16, 324/207.24, 207.26, 173, 174, 166, 163; 307/519, 282, 268; 327/102, 100, 108, 170, 190

[56] References Cited

U.S. PATENT DOCUMENTS

| | | | |
|---|---|---|---|
| 3,356,082 | 12/1967 | Jukes | 324/173 |
| 5,019,774 | 5/1991 | Rosenberg | 324/174 |
| 5,101,155 | 3/1992 | Oehler et al. | 324/173 |

*Primary Examiner*—Kenneth A. Wieder
*Assistant Examiner*—Kourosh Cyrus Khosravi
*Attorney, Agent, or Firm*—Kenyon & Kenyon

[57] ABSTRACT

A magnetic field alternation detecting apparatus includes a magnetic member sensor enclosed in a case and having a core (i.e., a yoke) to which a magnet is attached and around which a coil is wound. The magnetic member sensor obtains as an electromotive voltage a change in magnetic flux linking the coil on the basis of a magnetic field distribution disturbed by an approaching magnetic member present near the case from a pair of output terminals of the coil. An analog-to-digital converter is connected to the output terminals of the coil using at least one control terminal of a transistor such as a bipolar transistor or an enhancement operation field effect transistor. A main current terminal of the transistor is connected to a pair of output terminals.

11 Claims, 4 Drawing Sheets

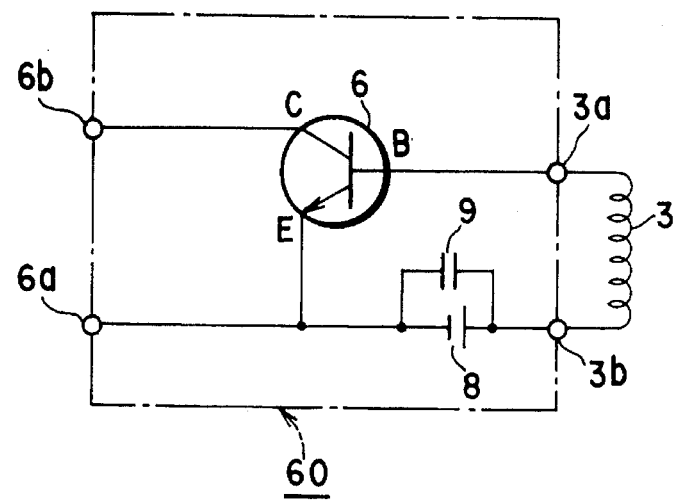
F I G. 5
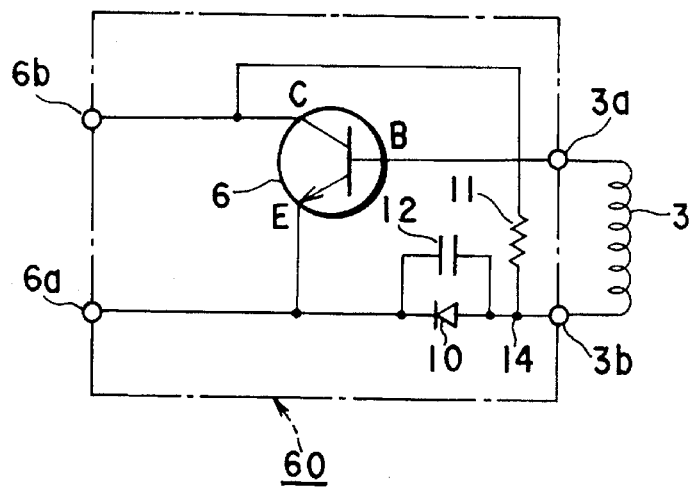
F I G. 6
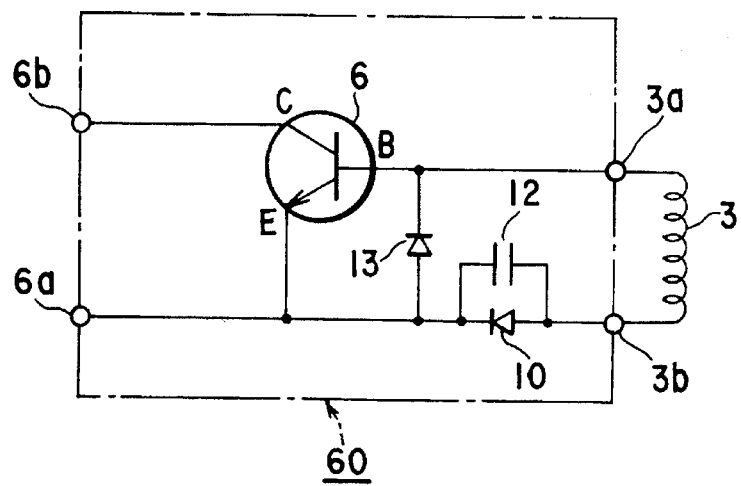
F I G. 7

MAGNETIC FIELD ALTERNATION DETECTING APPARATUS

BACKGROUND OF THE INVENTION

1. Field of the Invention

The present invention relates to a magnetic field alternation detecting apparatus for detecting that a magnetic member approaches the apparatus, based on an induced electromotive voltage generated by causing alternation of the magnetic flux density of a coil arranged to link magnetic fluxes by moving the magnetic member in a magnetic field.

2. Description of the Related Art

As a reference including descriptions associated with the apparatus of the present invention, the following Japanese-translated reference is known:

W. Leavens & N. Mencer, "Introduction of Car Electronics", Ed. Texas Instruments Learning Center In general, as an apparatus for detecting the rotational speed or the rotational frequency of a rotating member, a magnetic field alternation apparatus serving as a rotation sensor (e.g. deposition sensor) or a rotational frequency counter is often used. FIG. 9 shows an arrangement of a main part of a magnetic member sensor of this magnetic field alternation apparatus. In FIG. 9, an axially magnetized magnet 2 is attached to one end of a ferromagnetic core (i.e., yoke) 1, a coil 3 is wound around the shaft portion of the ferromagnetic core 1 directly or via a bobbin (not shown), and such an assembly is stored in a case 4, thus constituting a magnetic member sensor. When a magnetic field is disturbed by a rod-like ferromagnetic member 5, which is axially supported by a rotational shaft O, and is approaching the other end of the ferromagnetic core 1, an alternation in magnetic fluxes linking coil 3 is obtained as an electromotive voltage from output terminals 3a and 3b of coil 3 on the basis of a magnetic field distribution which changes as time elapses. The magnetic field alternation detecting apparatus is arranged to be able to supply the electromotive voltage to a signal processing unit (not shown) via these output terminals 3a and 3b.

In this prior art arrangement, the electromotive voltage obtained from the output terminals 3a and 3b of the coil 3 is determined by the alternation amount of the magnetic fluxes and the number of turns of the coil. However, in general, since the shape and size of this apparatus are limited according to a rotation detection object, i.e., the ferromagnetic member 5, as a means for increasing the electromotive voltage, a coil having a small wire diameter is adopted, and the number of turns of the coil is increased.

However, in the above-mentioned detecting apparatus, in order to manufacture a coil in the magnetic member sensor as its main part, a conductor wire having a small diameter i.e., a thin conductor wire) must be wound around a core a large number of times. However, the manufacture of such a coil requires considerable amounts of labor and time. Also, it is difficult for a coil manufactured as described above to assure an anti-shock strength and to assure stability of coupling of lead wires between the output terminals and an external connection portion. More specifically, such wires of the coil are disconnected unless a tension generated upon a winding of the wire is controlled and adjusted very carefully. Even after the coil is completed, the wires may often be disconnected by an external "mechanical shock" or a "heat shock" caused by a change in temperature during processing. In addition, slight corrosion of a connection portion with the coil may cause disconnection.

The above-mentioned drawbacks occur due to a structural problem, while the following problems may also be posed from an electrical point of view.

More specifically, an electronic device itself such as a sensor of this type is very sensitive to induction of an external electromagnetic interference (EMI) since the winding impedance of the coil is increased. Since the line-to-line capacity is increased, the output itself is not proportional to the number of turns.

In an apparatus of this type, since a detection unit and a signal processing unit are arranged to be separated from each other, these units are connected via lead wires having a required length. Therefore, especially in the magnetic member sensor having a large number of turns, the lead wires themselves undesirably serve as an antenna. As a result, unnecessary EMI enters an electrical output. In addition, the distributed capacity of a receiving apparatus including that of the lead wires leads to a decrease in output level.

SUMMARY OF THE INVENTION

The present invention provides a highly reliable magnetic field alternation detecting apparatus, which allows easy manufacture of the magnetic field alternation detecting apparatus itself by decreasing the number of turns of a coil in a magnetic member sensor, and allowing use of a coil formed by a wire having a relatively large diameter, and can stably supply a detection signal obtained from the magnetic member sensor to a signal processing unit.

In order to achieve the above object, the present invention has the following features in its arrangement.

More specifically, a magnetic field alternation detecting apparatus, which comprises a magnetic member sensor constituted by storing a coil wound around a core with a magnet in a case, and obtains, from output terminals of the coil, an alternation in magnetic flux linking the coil on the basis of a magnetic field distribution disturbed by an approaching magnetic member as an electromotive voltage, has the following four features.

As the first feature, the apparatus adopts an arrangement comprising an analog-to-digital (A/D) converter in which the output terminals of the coil are connected between control terminals of a transistor, and a main current terminal of the transistor is connected to a pair of output terminals.

As the second feature, the apparatus adopts an arrangement comprising an A/D converter in which the output terminals of the coil are connected between control terminals of a transistor serially through a bias power supply for generating a voltage slightly lower than a control voltage of the transistor, and a main current terminal of the transistor is connected to a pair of output terminals.

As the third feature, the apparatus adopts an arrangement comprising an A/D converter in which the output terminals of the coil are connected between control terminals of a transistor serially through a diode having a forward bias voltage slightly lower than a control voltage of the transistor, a main current terminal of the transistor is connected to a pair of output terminals, and a resistor is connected between a node between the coil and the anode of the diode, and the main current terminal of the transistor.

As the fourth feature, the apparatus adopts an arrangement comprising an A/D converter in which a first diode is connected between control terminals of a transistor, the output terminals of the coil are connected between the control terminals serially through a diode having a forward bias voltage slightly lower than a control voltage of the transistor, and a main current terminal of the transistor is connected to a pair of output terminals.

With the above-mentioned arrangement, the following effects can be expected.

In the first arrangement, since voltage value information input from the coil is lost due to the characteristics of the transistor of the A/D converter, and a pulse signal equivalent to that obtained by a comparator is obtained as an output signal instead, the output impedance is sufficiently lowered as compared to the output current power of the coil. Therefore, a sufficiently large output signal can be obtained even against peripheral EMI caused by extended output lead wires.

In the second arrangement, since the output voltage from the coil is superposed on the bias voltage slightly lower than the control terminal voltage of the transistor in the A/D converter, and is input between the control terminals of the transistor, the coil may have a performance for inducing a voltage lower than the control terminal voltage as the output voltage of the coil, and the number of turns of the coil can be decreased. Therefore, in addition to the above-mentioned electrical effect, the manufacture itself of the coil is facilitated, and a high mechanical strength of the coil against a mechanical shock can be assured.

In the third arrangement, since the output voltage from the transistor is supplied to the diode having the forward bias voltage slightly lower than the control terminal voltage of the transistor through the resistor as a bias voltage source, the same effect as in the above arrangement can be obtained even if a battery or the like is not used as the bias voltage source.

In the fourth arrangement, since the first diode is connected between the control terminals of the transistor in the A/D converter, and a counterelectromotive force of the coil is obtained as a bias voltage, a bias voltage can be stably obtained even when a bias voltage is not obtained from the output voltage of the transistor via the resistor, thus obtaining the same effect as in the above arrangement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention, and together with the general description given above and the detailed description of the preferred embodiments given below, serve to explain the principles of the present invention.

FIG. 5 is a circuit diagram showing an arrangement of an A/D converter according to the second embodiment of the present invention;

FIG. 6 is a circuit diagram showing an arrangement of an A/D converter according to the third embodiment of the present invention;

FIG. 7 is a circuit diagram showing an arrangement of an A/D converter according to the fourth embodiment of the present invention;

DETAILED DESCRIPTION

First Embodiment

Figure 1:
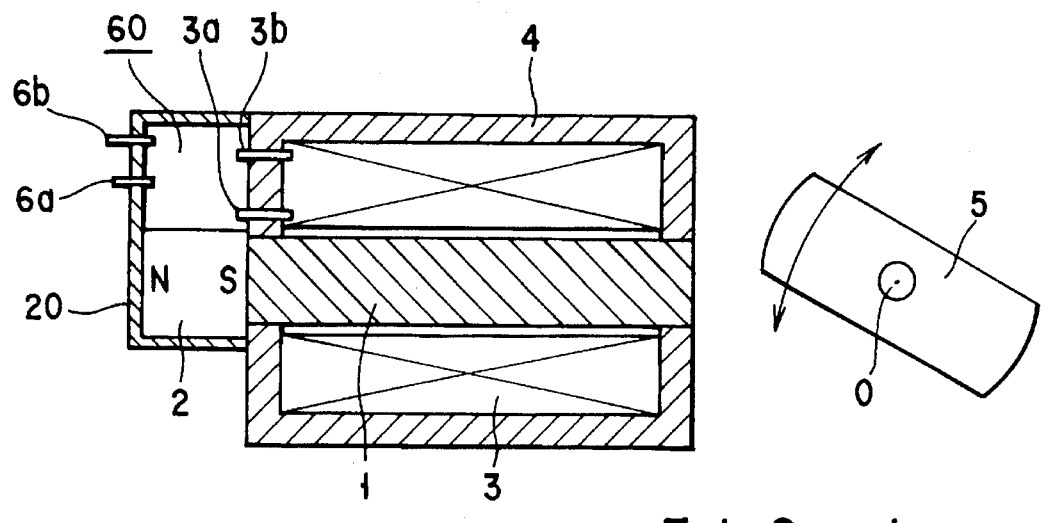
FIG. 1 is a sectional view showing a sensor in a magnetic field alternation detecting apparatus according to the first embodiment of the present invention.

FIG. 1 is a sectional view showing an arrangement of a magnetic member sensor in a magnetic field alternation detecting apparatus according to a first embodiment of the present invention. The same reference numerals in FIG. 1 denote the same parts as in FIG. 9, and a detailed description thereof will be omitted.

In this embodiment, as described above, output terminals 3a and 3b of a coil 3 wound around a ferromagnetic core 1 are connected at a position located outside a case 4, and adjacent to a magnet 2 attached to one end of the ferromagnetic core 1. In the coil 3, an induced electromotive force is generated upon movement or motion of a magnetic member 5 present near the coil 3, and a drifting microcurrent is obtained from the terminals 3a and 3b. An A/D converter 60 is arranged to convert an analog microcurrent signal into a saturated digital signal, and has output terminals 6a and 6b for supplying the digital signal to an externally connected signal processing unit (not shown). The magnet 2 and the A/D converter 60 are covered and integrated by another case 20.

Figure 2A:
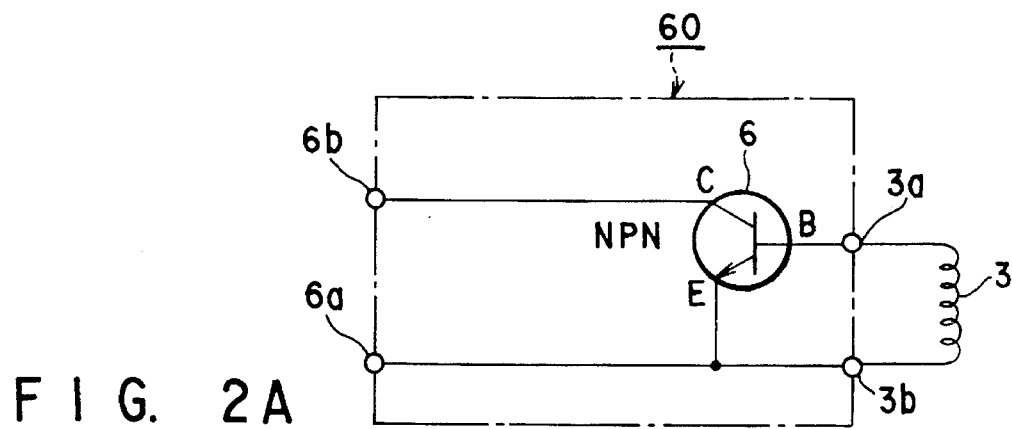
FIGS. 2A and 2B are circuit diagrams showing arrangements of analog-to-digital (A/D) converters in the first embodiment.

As shown in a circuit diagram of FIG. 2A, the above-mentioned A/D converter 60 is a circuit in which the output terminals 3a and 3b of the coil 3 are connected between control input terminals of a bipolar silicon transistor 6, and a main current terminal of the transistor 6 is one of the pair of output terminals 6a and 6b. The transistor 6 is an NPN semiconductor element having a base (B) as a control terminal, a collector (C) as a main current terminal, and an emitter (S) as a common terminal, and can perform linear amplification.

Figure 3A:
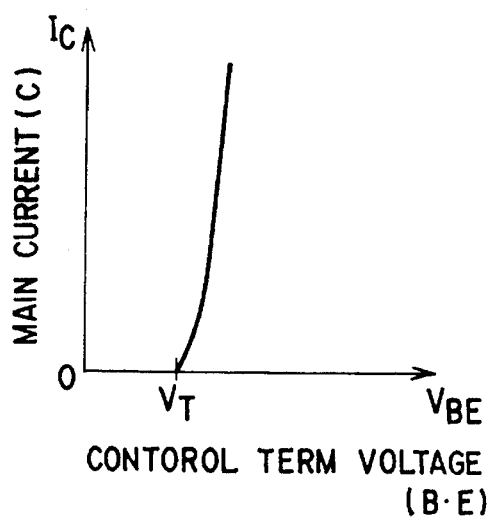
FIGS. 3A and 3B are graphs showing the characteristics of the A/D converters in the first embodiment.

As shown in a graph of FIG. 3A, as the electrical characteristics of this element, when a control terminal voltage $V_{BE}$ is equal to or lower than a predetermined value $V_T$, no main current $I_C$ flows; when the output voltage from the coil 3 exceeds this value $V_T$ even slightly, a large main current $I_C$ flows. In this case, the fact that the control performance of the main current abruptly changes is suitable for a case wherein the detecting apparatus is connected to an input circuit pulled up by a resistor such as a digital input device of a microprocessor.

When the A/D converter 60 with the above-mentioned arrangement is connected to the output terminals 3a and 3b of the coil 3 of the magnetic member sensor, voltage information is lost, and instead, a pulse signal equivalent to that obtained when a comparator (not shown) is used is obtained as the output signal of the A/D converter 60.

Figure 4A:
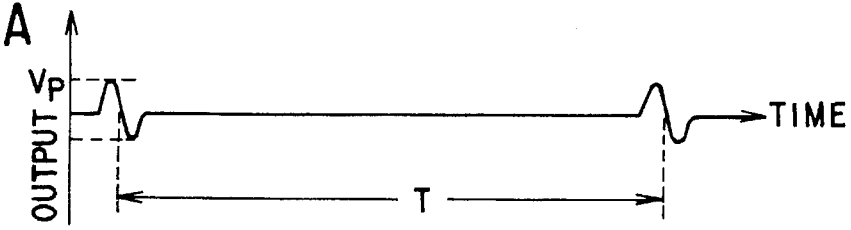
FIGS. 4A to 4C are timing charts showing the relationship between a coil voltage output and an output terminal voltage of a transistor in the first embodiment.
Figure 4B:
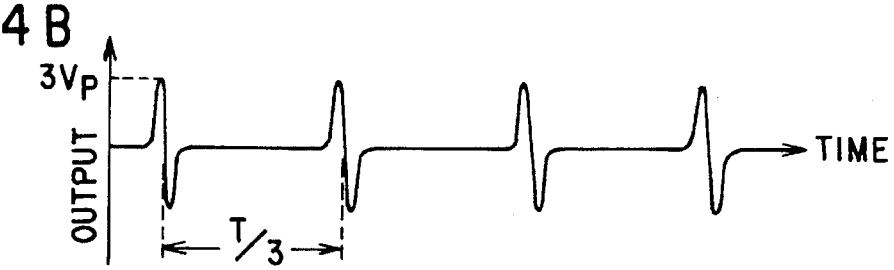
Figure 4C:
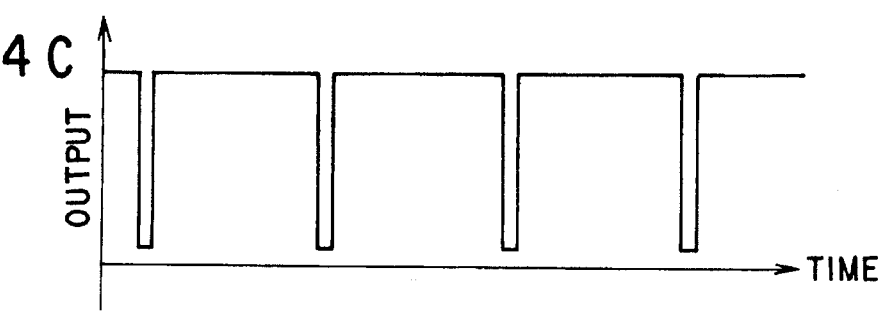

More specifically, FIGS. 4A and 4B show the relationship between the period of rotation of the rod-like magnetic member 5 (FIG. 1) about the center O and the output voltage of the A/D converter 60. FIG. 4A shows a waveform representing a change in output voltage at the rotational speed (i.e., a period T) of the ferromagnetic member 5, and FIG. 4B shows a waveform representing a change in output voltage at a rotational speed (i.e., a period T/3) three times that in FIG. 4A. As can be seen from FIGS. 4A and 4B, an induced electromotive force generated in the coil 3 is proportional to the rate of change in magnetic flux. Therefore, when the output voltage from the coil 3 is input to the A/D converter 60, the output terminal voltage of the transistor 6 is converted into a pulse signal having a waveform shown in FIG. 4C. In this case, a threshold voltage $V_{BE}$ of the control terminal of the transistor 6 in FIG. 3A is twice $V_p$ (i.e., $V_{BE}=2V_p$), and the above-mentioned output voltage is obtained in correspondence with the rotation for a period T/2 or more of the magnetic member 5.

Therefore, the output impedance is sufficiently lowered as compared to the output power of a current generated in the coil 3, and a sufficiently large output signal can be obtained as compared to peripheral EMI due to extension of output lead wires caused by interconnections in a practical application, thus eliminating the influence of other noise components. For this reason, the output characteristics themselves of the magnetic member sensor can be greatly improved.

Modification

The type of transistor adopted in the detecting apparatus of the present invention is not particularly limited.

Figure 2B:
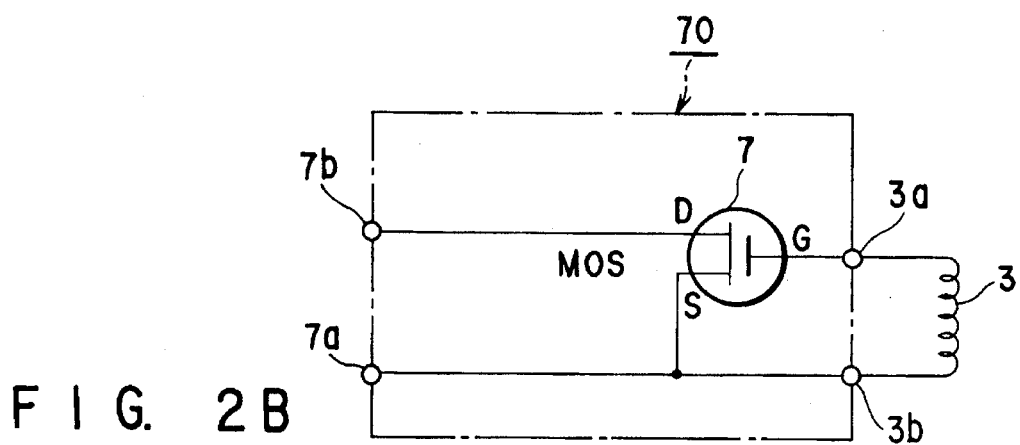

For example, in place of the NPN silicon transistor shown in FIG. 2A, a MOS transistor 7 shown in FIG. 2B may be used. An A/D converter 70 of a magnetic member sensor including such a MOS transistor 7, the input terminals 3a and 3b also serving as the output terminals of the coil 3, and the output terminals 7a and 7b may be arranged as illustrated in FIG. 2B.

Figure 3B:
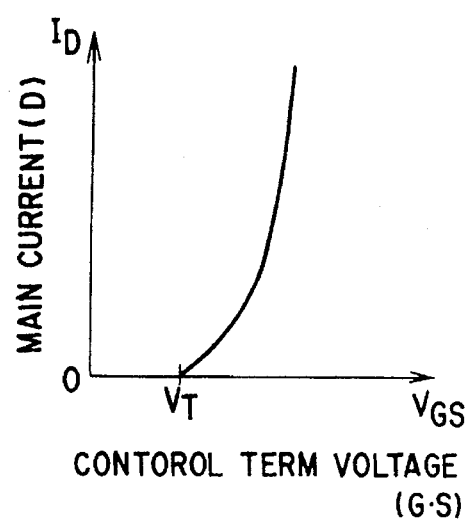

As shown in the graph of FIG. 3B, as the electrical characteristics of this element, the gate (G) is used as a control terminal, the drain (D) is used as a main current terminal, and the source (S) is used as a common terminal. When an output voltage $V_{GS}$ is equal to or lower than a predetermined voltage $V_T$, no main current $I_D$ flows when the output voltage $V_{GS}$ from the coil 3 exceeds this value $V_T$ even slightly, a very large main current $I_D$ flows.

In this case, the fact that the main current $I_D$ is generated when the gate-source voltage $V_{GS}$ is low (i.e., 0 V in FIG. 3B) (i.e., the main current "rises fast") is suitable for a case wherein the main current is input to a device (e.g., a microprocessor) connected to the output side of the sensor.

Other embodiments (second to fourth embodiments) of the present invention will be described hereinafter.

In the A/D converter shown in FIG. 2A, since the electromotive voltage generated by the coil 3 must become higher than the control terminal voltage $V_T$ of the transistor 6, the number of turns of the coil must be large in order to obtain a voltage equal to or higher than the voltage $V_T$. Therefore, problems associated with easy manufacture of the coil and a mechanical shock of the coil remain unsolved.

Second Embodiment

The circuit diagram of FIG. 5 shows an arrangement of an A/D converter which can solve the above-mentioned problem (i.e., a problem associated with the mechanical strength of a coil). The same reference numerals in FIG. 5 denote the same parts as in FIG. 2A. In FIG. 5, a voltage source 8 for assuring a bias voltage $V_S$ slightly lower than the control terminal voltage $V_T$ of the transistor 6 is connected in series with the coil 3, and the output voltage from the coil 3 is superposed on this bias voltage $V_S$. In this case, since the control terminal voltage $V_T$ of a versatile signal processing bipolar transistor is about 700 mv, the bias voltage $V_S$ can be about 500 mV.

The voltage value of such a level can be easily attained since various materials given with a polarized voltage by polarization can be used without using any battery. However, since these materials have a large internal impedance, a bypass capacitor 9 for bypassing a pulse voltage generated in the coil 3 must be used in parallel with voltage source 8.

When the A/D converter 60 with the above arrangement is connected to the output terminals 3a and 3b of the coil 3, the coil 3 need only induce a voltage lower than the control terminal voltage $V_T$. Therefore, the number of turns of the coil can be decreased. For example, under a condition that a peak voltage of about 1.5 V is obtained by a coil which adopts a wire having a wire diameter of 0.01 mm, and the number of turns of 3,600, it is demonstrated that a coil which uses a wire having a wire diameter twice that of the former coil and the number of turns decreased to about ¼ (i.e., 850) can obtain a sufficient output in use. More specifically, the coil can exhibit the same performance as in the first embodiment even if it uses a wire having a mechanical strength four times that of a conventionally used wire (i.e., a ×2 wire diameter), and the number of turns ¼ that of the conventional coil.

Therefore, since the number of turns of the coil itself, which must be processed within a limited volume to attain a compact, light-weight structure, can be decreased, the manufacture itself of the coil 3 can be facilitated as compared to a coil having the conventional number of turns (i.e., four times that in this embodiment). Since a wire having a large wire diameter (i.e., a thick wire) can be used, the sufficiently high mechanical strength of the coil 3 against the mechanical shock can be maintained. As a result, reliability of this apparatus as a product when viewed from the user's side can be improved.

Third Embodiment

In the circuit diagram of the above-mentioned second embodiment (of FIG. 5), the voltage source 8 is arranged in the A/D converter 60. The third embodiment to be described below discloses an arrangement wherein the transistor 6 is operated without using this voltage source, and will be described below with reference to FIG. 6.

In the A/D converter 60 shown in FIG. 6, a diode 10 having a forward bias voltage $V_F$ (not shown) slightly lower than the control terminal voltage $V_T$ of the transistor 6 is connected in series with the coil 3, and a predetermined resistor 11 is connected between a node 14 between the coil 3 and the anode of the diode 10, and the main current output terminal (C) side of the transistor 6, thus forming a "bias source (e.g., a bias power source)" for supplying an almost constant voltage based on the characteristics of the forward bias voltage $V_F$ of the diode 10.

Since the function of the bias source deteriorates when the transistor 6 is enabled, and the potential at the output terminals 6a and 6b decreases, the apparatus cannot often perform a sufficient operation. In order to prevent this, in this embodiment, a capacitor 12 is connected in parallel with the diode 10 with this improvement, since the capacitor 12 is always charged to a constant level, the function will not deteriorate due to an insufficient voltage. Therefore, the same effect as in the graphs of FIGS. 4A and 4B of the first embodiment can be obtained using the A/D converter 60 with the above-mentioned arrangement.

Fourth Embodiment

In the circuit diagram of the above-mentioned third embodiment (of FIG. 6), since the bias voltage $V_S$ of the transistor 6 is obtained via the resistor 11 connected between the diode and the main current output terminal, the output voltage is undesirably lowered. In the fourth embodiment of the present invention, an A/D converter which can solve the above-mentioned problem will be described below with reference to FIG. 7.

In the following description, the same reference numerals in FIG. 7 denote the same parts as in FIG. 6.

More specifically, FIG. 7 illustrating the fourth embodiment shows a circuit for obtaining a bias voltage $V_S$ by utilizing a counterelectromotive force generated in the coil 3 without using the resistor 11 of the third embodiment illustrated in FIG. 6. More specifically, a diode 13 is connected between the base (B) and the emitter (E) of the transistor 6 in a direction to add a charging voltage of the capacitor 12.

According to the A/D converter 60 with the above-mentioned arrangement, since the voltage source (e.g., a battery) in the second embodiment (of FIG. 5) can be omitted, the function of the apparatus can be prevented from deteriorating due to an exhausted battery, which may occur in a circuit including a battery having a finite storage capacity and constituting a voltage source. In addition, a decrease in output voltage in use can be fundamentally eliminated as in the third embodiment.

According to the arrangement of the elements, such as the voltage source 8 shown in FIG. 5, the diode 10 shown in FIG. 6 and the diode 13 shown in FIG. 7, the circuits obtain a sufficient bias voltage. Consequently, the present apparatus can exhibit high sensitivity of detection.

Another Embodiment

Figures 8, 9:
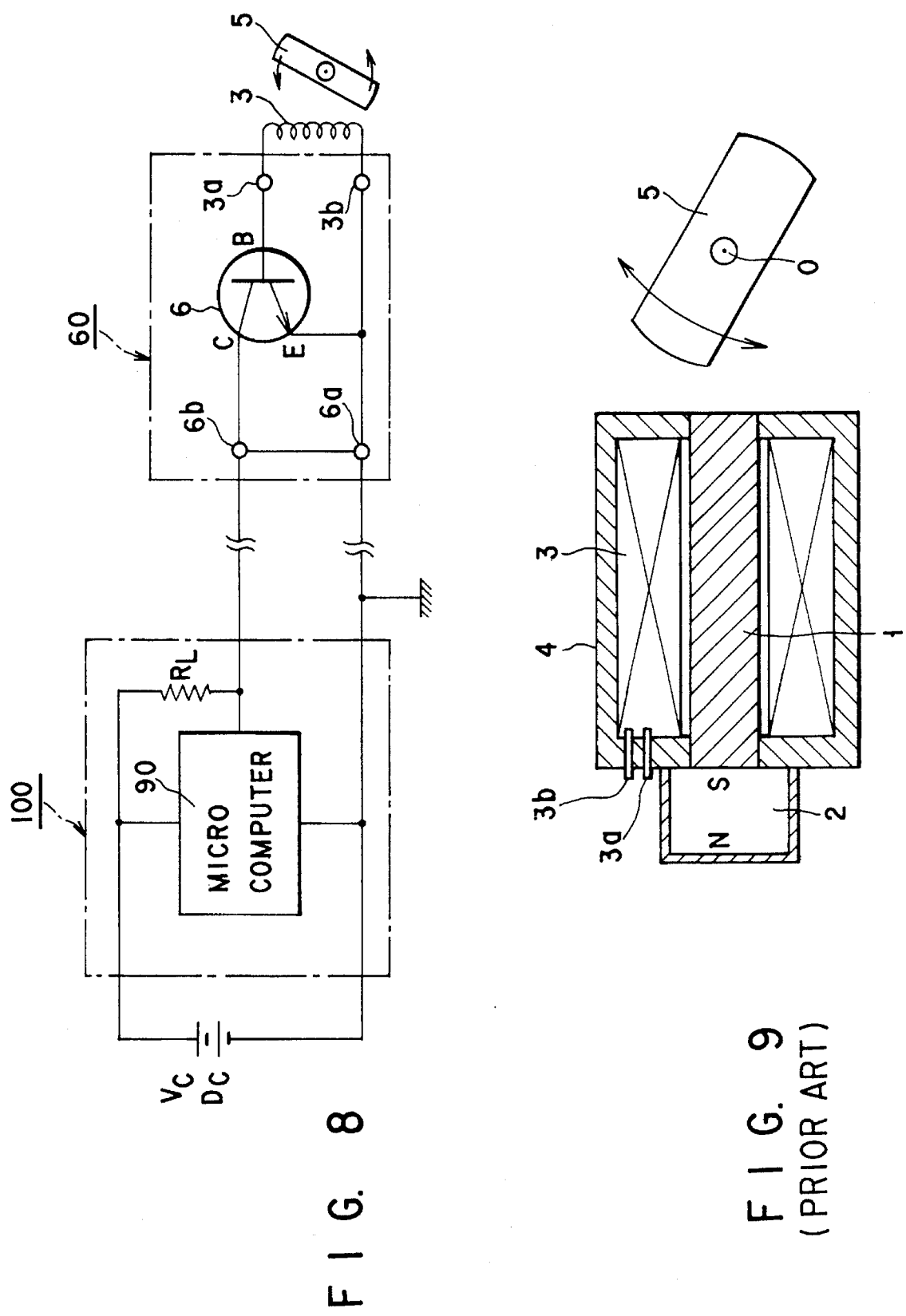
FIG. 8 is a circuit diagram showing an application example wherein the A/D converter of the first to fourth embodiments and a sensor portion (e.g. coil) are applied to a controller of an actual air conditioner.
FIG. 9 is a sectional view showing an arrangement of a sensor in a conventional magnetic field alternation detecting apparatus.

FIG. 8 shows an embodiment of the present invention wherein the A/D converter 60 in one of the first to fourth embodiments and the magnetic member sensor (e.g., the coil 3) are connected to a controller 100 for, e.g., a compressor of an actual air conditioner.

The controller 100 is constituted by a microcomputer 90 which receives sensing information (i.e., measured rotational frequency information) supplied from the A/D converter 60 or 70 constituted by the transistor 6 (of FIG. 2A) or 7 (of FIG. 2B), performs predetermined digital processing of the received information to start predetermined analysis and corresponding operations, and properly controls these operations.

More specifically, the magnetic field alternation detecting apparatus according to the present invention serves as a so-called "rotational frequency sensor" in this case. In this embodiment, the present invention is applied to a device having the controller 100 for a device to which the sensor is to be attached (e.g., a compressor of an air conditioner).

More specifically, the A/D converter 60 connected to the coil 3 arranged near a rotating portion 5 of a rotary fan or a motor (not shown) of a compressor of an air conditioner is connected to the controller 100 for controlling this air conditioner via a digital port.

The controller 100 controls the air conditioner to perform an optimal operation determined by a predetermined calculation method considering various factors causing a change in temperature on the basis of the current temperature information sensed by a temperature sensor (not shown) attached to a predetermined position, and sensing information associated with the rotational frequency of the motor of the air conditioner, which information is detected by the sensor of the present invention and is converted into digital data.

In each of the above embodiments a bipolar element is used, as a transistor constituting the A/D converter 60. Instead, a field effect transistor such as an enhancement type element having a low control terminal voltage may be used. Particularly, in this case, the collector (C), base (B), and emitter (E) electrodes can be connected to the output terminals 3a and 3b of the coil 3 and the output terminals of the A/D converter 60 in correspondence with the drain (D), gate (G), and source (S) electrodes, respectively.

Application

As a device to which the magnetic member sensor of the present invention is to be attached, the present invention is not limited to the air conditioner having a rotating portion, but may be applied to various other devices. For example, the present invention can be easily applied to various other electrical and mechanical devices having rotary systems or moving systems like in the above embodiments, and can be utilized in various other devices.

As described above, according to the present invention, since the number of turns of the coil of the magnetic member sensor is decreased, and the coil having a relatively large wire diameter can be used, the manufacture of the sensor itself is facilitated, and also a highly reliable and sensitive magnetic field alternation detecting apparatus, which can stably supply a detection signal obtained from the magnetic member sensor to a signal processing unit, can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic field alternation detecting apparatus, comprising:

an electromagnet including a coil wound around a core attached with a magnet, the electromagnet forming a predetermined magnetic field;

an analog-to-digital converter arranged adjacent to said electromagnet and converting an analog signal into a digital signal;

a first pair of output terminals receiving analog data obtained as an electromotive voltage indicating a change in magnetic flux linking said coil on the basis of a magnetic field distribution disturbed by periodic approaching of a magnetic member which is present near a first end portion of said core and makes a .predetermined motion, wherein the first pair of output terminals are arranged at a second end portion of said core, and are connected to input terminals of said analog-to-digital converter; and a second pair of output terminals arranged at output terminals of said analog-to-digital converter;

wherein said analog-to-digital converter comprises a predetermined type of transistor, wherein said first pair of output terminals are connected to at least one control terminal of said transistor, and wherein said second pair of output terminals are connected to at least one main current terminal of said transistor.

2. A magnetic field alternation detecting apparatus, comprising:

an electromagnet including a coil wound around a core attached with a magnet, the electromagnet forming a predetermined magnetic field;

an analog-to-digital converter arranged adjacent to said electromagnet and converting an analog signal into a digital signal;

a first pair of output terminals receiving analog data obtained as an electromotive voltage indicating a change in magnetic flux linking said coil on the basis of a magnetic field distribution disturbed by periodic approaching of a magnetic member which is present near a first end portion of said core and makes a predetermined motion, wherein the first pair of output terminals are arranged at a second end portion of said core, and are connected to input terminals of said analog-to-digital converter; and a second pair of output terminals arranged at output terminals of said analog-to-digital converter;

wherein said analog-to-digital converter comprises a bipolar transistor, wherein at least one of control terminals of said bipolar transistor is connected to said coil via said first pair of output terminals, and wherein at least one of main current terminals of said bipolar transistor is connected to said second pair of output terminals.

3. A magnetic field alternation detecting apparatus, comprising:

an electromagnet including a coil wound around a core attached with a magnet, the electromagnet forming a predetermined magnetic field;

an analog-to-digital converter arranged adjacent to said electromagnet and converting an analog signal into a digital signal;

a first pair of output terminals receiving analog data obtained as an electromotive voltage indicating a change in magnetic flux linking said coil on the basis of a magnetic field distribution disturbed by periodic approaching of a magnetic member which is present near a first end portion of said core and makes a predetermined motion.

wherein the first pair of output terminals are arranged at a second end portion of said core, and are connected to input terminals of said analog-to-digital converter; and a second pair of output terminals arranged at output terminals of said analog-to-digital converter;

wherein said analog-to-digital converter comprises an enhancement operation field effect transistor, wherein at least one of control terminals of said enhancement operation field effect transistor is connected to said coil via said first pair of output terminals, and wherein at least one of main current terminals of said enhancement operation field effect transistor is connected to said second pair of output terminals.

4. A magnetic field alternation detecting apparatus, comprising:

an electromagnet including a coil wound around a core attached with a magnet, the electromagnet forming a predetermined magnetic field;

an analog-to-digital converter arranged adjacent to said electromagnet and converting an analog signal into a digital signal;

a first pair of output terminals receiving analog data obtained as an electromotive voltage indicating a change in magnetic flux linking said coil on the basis of a magnetic field distribution disturbed by periodic approaching of a magnetic member which is present near a first end portion of said core and makes a predetermined motion.

wherein the first pair of output terminals are arranged at a second end portion of said core, and are connected to input terminals of said analog-to-digital converter; and a second pair of output terminals arranged at output terminals of said analog-to-digital converter;

wherein said core around which said coil is wound is arranged in a first case enclosing said coil and said core, wherein said magnet and said analog-to-digital converter are arranged in a second case integrally enclosing said magnet and said analog-to-digital converter, wherein said first and second case are arranged adjacent to each other, and wherein said analog-to-digital converter comprises at least one of a bipolar transistor and an enhancement operation field effect transistor.

5. A magnetic field alternation detecting apparatus, comprising:

a magnetic member sensor including a core having an end portion integrally attached to a magnet, an electromagnetic coil including a coil having a predetermined diameter wound around said core a predetermined number of times, a first pair of output terminals connected to a plurality of end portions of said electromagnetic coil, and a first case entirely enclosing and integrally storing said electromagnetic coil, wherein said electromagnetic coil senses as an electromotive voltage a change in magnetic flux linking said coil on the basis of a magnetic field distribution disturbed upon movement of a magnetic member, which is present near an end portion opposite to the end portion, attached with said magnet, of said magnetic member sensor, and makes a predetermined motion;

an analog-to-digital converter including a predetermined type of transistor, the analog-to-digital converter converting the change in electromotive voltage as analog data into digital data;

wherein said first pair of output terminals is connected between at least one control terminal of said transistor, and wherein a main current terminal of said transistor is connected to a second pair of output terminals as output terminals of said magnetic member sensor; and a bias power source generating a voltage which is slightly lower than a control terminal voltage of said transistor, said bias power source connected directly to the electromagnetic coil, wherein a voltage obtained by superimposing the voltage generated by the bias power source and a voltage produced by the electromagnetic coil is used to control the transistor.

6. The apparatus according to claim 5, wherein said bias power source is a battery having a voltage slightly lower than a control voltage of said transistor and is connected in series between control terminals of said transistor, and wherein the main current terminal is connected to said second pair of output terminals.

7. A magnetic field alternation detecting apparatus, comprising:

a magnetic member sensor including a core having an end portion integrally attached to a magnet, an electromagnetic coil including a coil having a predetermined diameter wound around said core a predetermined number of times, a first pair of output terminals connected to a plurality of end portions of said electromagnetic coil, and a first case entirely enclosing and integrally storing said electromagnetic coil, wherein said electromagnetic coil senses as an electromotive voltage a change in magnetic flux linking said coil on the basis of a magnetic field distribution disturbed upon movement of a magnetic member, which is present near an end portion opposite to the end portion, attached with said magnet, of said magnetic member sensor, and makes a predetermined motion;

an analog-to-digital converter including a predetermined type of transistor, the analog-to-digital converter converting the change in electromotive voltage as analog data into digital data;

wherein said first pair of output terminals is connected between at least one control terminal of said transistor, and wherein a main current terminal of said transistor is connected to a second pair of output terminals as output terminals of said magnetic member sensor;

a series circuit including a resistor and a capacitor, the series circuit receiving at least a portion of power supply energy supplied from an input device, the power supply energy supplied to the series circuit via a load resistor connected to an output terminal of the transistor; and a constant voltage source including a diode, the diode having a voltage slightly lower than a control terminal voltage of said transistor and connected in a predetermined direction in series between control terminals of said transistor, the constant voltage source supplying a voltage across the capacitor which is slightly lower than the control terminal voltage, wherein a voltage obtained by superimposing the voltage supplied by said constant voltage source and a voltage produced by the electromagnetic coil is used to control the transistor;

wherein the main current terminal is connected to said second pair of output terminals and the resistor is connected between a node between said coil and an anode of said diode, and the main current terminal.

8. An apparatus according to claim 5, further comprising:

a first diode connected between control terminals of said transistor, and a second diode having a voltage slightly lower than a control voltage of said transistor and connected in a predetermined direction in series with said first pair of output terminals, wherein the main current terminal of said transistor is connected to said second pair of output terminals; and wherein the first diode comprises a rectifier diode charging a capacitor with a negative voltage produced by the electromagnetic coil, wherein said electromagnetic coil produces said negative voltage and a positive voltage used as an input signal to said transistor.

9. The apparatus according to claim 5, wherein said analog-to-digital converter is connected, via said second pair of output terminals, to control realization means for performing predetermined control for a device to which said magnetic field alternation detecting apparatus is to be attached, said control realization means receiving digital sensing information supplied from said analog-to-digital converter via said second output terminals, executing predetermined digital processing based on the received information to start predetermined analysis and corresponding operations for the device, and properly controlling the operation of the device.

10. The apparatus according to claim 9, wherein said magnetic field alternation detecting apparatus serves as a rotational frequency sensor for the device having a rotary system which makes a predetermined rotation, wherein said control realization means comprises a microprocessor controlling the device, wherein at least a portion of a rotary portion of said rotary system of the device includes a magnetic member having at least a predetermined mechanical strength, wherein said magnetic field alternation detecting apparatus is arranged within a range where at least a magnetic field of said magnetic member has an influence, and wherein an operation of the device is controlled by outputting measured rotational frequency information as one of the digital sensing information to said microprocessor via said second pair of output terminals.

11. The apparatus according to claim 5, wherein said transistor is an enhancement operation field effect transistor, which has a control electrode voltage lower than a predetermined value, and wherein drain, gate, and source electrodes of said enhancement operation field effect transistor are each connected to at least one of said first and said second pair of output terminals.

* * * * *

UNITED STATES PATENT AND TRADEMARK OFFICE
CERTIFICATE OF CORRECTION

PATENT NO. : 5,483,156
DATED : January 9, 1996
INVENTOR(S) : Toshihiko NISHIHARA It is certified that error appears in the above-indentified patent and that said Letters Patent is hereby corrected as shown below:

| Column | Line | |
|---|---|---|
| 1 | 54 | Change "i.e.," to --(i.e.,--. |
| 6 | 45 | Change "(of FIG. 5)" to --of FIG. 5--. |
| 7 | 8 | Change "(of FIG. 6) to --of FIG. 6--. |
| 7 | 52 | Change "(of FIG. 2A) to --of FIG. 2A--. |
| 7 | 53 | Change "(of FIG. 2B) to --of FIG. 2B--. |
| 8 | 11 | After "embodiments" insert --,--. |
| 8 | 12 | After "used" delete ",". |

Signed and Sealed this

Fourteenth Day of May, 1996

Attest:

BRUCE LEHMAN

Attesting Officer   Commissioner of Patents and Trademarks